United States Patent [19]

Tachikawa

[11] Patent Number: 4,959,870
[45] Date of Patent: Sep. 25, 1990

[54] CHARACTER RECOGNITION APPARATUS HAVING MEANS FOR COMPRESSING FEATURE DATA

[75] Inventor: Michiyoshi Tachikawa, Tokyo, Japan

[73] Assignee: Ricoh Company, Ltd., Japan

[21] Appl. No.: 197,225

[22] Filed: May 23, 1988

[30] Foreign Application Priority Data

May 26, 1987 [JP] Japan .................................. 62-129083
Jun. 29, 1987 [JP] Japan .................................. 62-162111

[51] Int. Cl.$^5$ .................................................. G06K 9/56
[52] U.S. Cl. .......................................... 382/56; 382/18; 382/21; 382/51
[58] Field of Search ................ 382/9, 11, 16, 18, 21, 382/51, 56

[56] References Cited

U.S. PATENT DOCUMENTS

| | | | |
|---|---|---|---|
| 4,103,287 | 6/1978 | Frank | 382/56 |
| 4,163,214 | 7/1979 | Komori et al. | 382/56 |
| 4,797,944 | 1/1989 | Tanaka | 382/56 |
| 4,903,312 | 2/1990 | Sato | 382/18 |
| 4,903,313 | 2/1990 | Tachikawa | 382/9 |

*Primary Examiner*—Leo H. Boudreau
*Assistant Examiner*—Michael R. Cammarata
*Attorney, Agent, or Firm*—Mason, Fenwick & Lawrence

[57] ABSTRACT

A character recognition apparatus comprises an extracting part for extracting a feature of a character within an image data related to a document in a form of a feature vector having components which are histogram values of n degree peripheral pattern describing the feature of the character by distances from an arbitrary side of a character frame to each of first through nth detected contour of the character within the frame, a compression part for compressing the feature vector into a compressed feature vector having components which are quantized data, a dictionary which stores compressed feature vectors of standard characters, and a matching part for matching the compressed feature vector obtained from the compression part with each of the compressed feature vectors stored in the dictionary so as to output at least one candidate character corresponding to one of the standard characters described by a compressed feature vector having a minimum difference with the compressed feature vector obtained from the compression part out of the compressed feature vectors stored in the dictionary.

11 Claims, 8 Drawing Sheets

FIG.1 (PRIOR ART)

| DIRECTION CODE | 0 | 1 | 2 | 3 | 4 | 5 | 6 | 7 |
|---|---|---|---|---|---|---|---|---|
| DOT PATTERN | ○○○<br>○○○<br>○○○ | ○○○<br>○○○<br>○●○ | ●○○<br>○○○<br>○○○ | ○○○<br>○○○<br>●○○ | ○○○<br>○○●<br>○○○ | ●○○<br>○○○<br>○●○ | ●○○<br>○○○<br>○○● | ○○●<br>○○○<br>○●○ |

| DIRECTION CODE | 8 | 9 | 9 | 9 | 9 | 9 | 9 | 9 |
|---|---|---|---|---|---|---|---|---|
| DOT PATTERN | ○○●<br>●○○<br>○○○ | ○○○<br>●○○<br>○○○ | ●○○<br>○○●<br>○○○ | ●○○<br>●○○<br>○○○ | ●○○<br>●○○<br>○○○ | ○○○<br>●○○<br>○○○ | ●○●<br>●○●<br>○○○ | ●○●<br>●○●<br>○○○ |

CHARACTER RECOGNITION APPARATUS HAVING MEANS FOR COMPRESSING FEATURE DATA

BACKGROUND OF THE INVENTION

The present invention generally relates to character recognition apparatus, and more particularly to a character recognition apparatus which employs an n degree peripheral pattern to compress feature data extracted from a character.

Compression of feature data extracted from a character using the n degree peripheral pattern has been proposed in the past. According to this proposed compression using the n degree peripheral pattern, a direction code is added to contour picture elements of a character pattern. The direction code indicates the direction in which the picture elements constituting the character pattern extend. FIG. 1 shows an example of the direction code in relation to the dot pattern. In FIG. 1, a black dot indicates a picture element of the character pattern, and a white dot indicates a contour picture element of the character pattern. When assigning the direction code to the picture elements included in a frame F shown in FIG. 2 which contains the character pattern, a matching is made to determine the direction code for each picture element.

In FIG. 2, only a portion of the picture elements are shown for convenience' sake, and the direction code is indicated at the position of the picture element. No direction code is assigned to the picture elements of the character pattern, but it is also possible to assign a direction code to such picture elements by modifying the direction codes shown in FIG. 1. The frame F containing the character pattern is scanned from each side of the frame to a confronting side of the frame as indicated by arrows in FIG. 2, so as to detect the direction code which appears next to the white (background). For example, the direction code detected first along the scanning line is classified as a first direction code and the direction code detected second is classified as a second direction code. The frame is divided into a plurality of regions, and a histogram of the direction codes is obtained to a certain degree of the direction code with respect to each of the regions. A vector having the histogram values as components thereof is used as a feature vector describing the feature of the character pattern.

In other words, when the frame is divided into four regions, for example, distances to the contour picture elements along the scanning direction are calculated for each region, so as to describe the character pattern in terms of such distances. The calculated distances are referred to as a peripheral pattern describing the feature of the character pattern. Hence, the distance to the first contour picture element along the scanning direction in each region constitutes the first peripheral pattern, and the distance to the second detected contour picture element along the scanning direction in each region constitutes a second peripheral pattern.

The assigning of the direction code (or directionality code) to the picture elements and the use of the n degree peripheral pattern (or multilayer directionality code histogram method) are further disclosed in the U.S. Pat. application Ser. No. 069,303 filed July 2, 1987, now U.S. Pat. No. 4,903,313, the disclosure of which is hereby incorporated by reference.

When making a character recognition, such a feature vector is extracted from an input character pattern, and an operation is carried out to calculate a distance between the feature vector of the input character pattern and feature vectors of standard patterns registered in a dictionary. When the distance becomes a minimum with respect to the feature vector of a certain standard pattern, the input character pattern is recognized as a character having the certain standard pattern.

The use of the n degree peripheral pattern is advantageous in that the character recognition can be made with a high accuracy with respect to a character having a large deformation such as a hand-written character. However, there is a problem in that the degree of the feature vector becomes large. For example, when eight kinds of codes are added as the direction code, the frame of the character pattern is made up of regions of four by four and the direction code is extracted to the second peripheral pattern, the degree of the feature vector becomes 256 ($=4 \times 4 \times 2 \times 8$).

When the degree of the feature vector is large, there are problems in that the capacity of the dictionary becomes large and a matching time becomes long due to the increased operation to calculate the distance between the feature vector of the input character pattern and the feature vectors of standard patterns registered in the dictionary. A data compression of the feature vector is effective in eliminating these problems.

There basically are two data compression methods. A first data compression method is based on an orthogonal transform such as the Fourier transform using the frequency characteristic of the subject data, the main component analysis using statistical characteristic, or the Karhunen-Loève transform. The application of such methods to the character pattern is known from "HANDWRITING, TYPE OCR" by Sakai et al, Toshiba Review, Vol.38, No.13, 1983, for example. On the other hand, the application to the feature vector is known from "HAND-WRITTEN KANJI AND HIRAGANA RECOGNITION USING WEIGHT DIRECTION EXPONENTIAL HISTOGRAM AND PSEUDO BAYES DISCRIMINATION" by Harada et al, Shingakugiho, PRL83-68, 1983. However, processes based on such methods are generally complex and difficult to carry out at a high speed. For this reason, these methods are not suited for the purpose of reducing the matching time.

A second data compression method is based on the delta modulation or differential pulse code modulation (DPCM) which are used for data having a strong correlation such as time-sequential data, or the run length code, MH code, MR code or the like which are used for image data compression. However, when an attempt is made to improve the data compression rate by using such methods, there is a problem in that the distortion in the reproduced data becomes large. Therefore, these methods are not suited for compression of the feature vector when using the n degree peripheral pattern.

Recently, there is attention on the vector quantization due to the rate-distortion theory which clarifies the problems of the data compression rate and the distortion in the reproduced data. The application to audio and image data compression is disclosed in "VECTOR QUANTIZATION" by Tasaki et al, Shingakkaishi, Vol.67, No.5, 1984 and "COMPRESSION OF PRINTING IMAGE USING APPLIED VECTOR QUANTIZATION" by Kaizu et al, Shingakugiho IE86-94, 1986, for example.

If the quantization unit (group) can be appropriately determined, a high data compression rate can be anticipated. However, although the quantization unit (group) is evident for the time-sequential data such as the audio data, the appropriate quantization unit and concrete conditions are not yet established for the feature vectors used in the character recognition such as the feature vector used in the n degree peripheral pattern. For this reason, the quantizing error is large in the conventional case.

SUMMARY OF THE INVENTION

Accordingly, it is a general object of the present invention to provide a novel and useful character recognition apparatus in which the problems described heretofore are eliminated.

Another and more specific object of the present invention is to provide a character recognition apparatus comprising scanning means for scanning a document and for producing image data related to the document; character extracting means for extracting from the output image data of the scanning means a character contained in a frame; feature extracting means for extracting a feature of the character extracted in the character extracting means in a form of a feature vector, where the feature vector has components which are histogram values of n degree peripheral pattern describing the feature of the character by distances from an arbitrary side of the frame to each of first through nth detected contour of the character within the frame; compression means for compressing the feature vector from the feature extracting means into a compressed feature vector having components which are quantized data, where the compression means comprises rearranging means for grouping the components of the feature vector into a predetermined number of groups for every predetermined number of degrees by uniformly distributing the components of the feature vector to each group depending on a sum of an average value and standard deviation of the components of the feature vector for each degree and quantizer means for quantizing the components in each group with an independent quantization level for each group so as to obtain the quantized data having a predetermined number of bits for each group, a dictionary which stores compressed feature vectors of standard characters; and matching means for matching the compressed feature vector obtained from the compression means with each of the compressed feature vectors stored in the dictionary so as to output at least one candidate character corresponding to one of the standard characters described by a compressed feature vector having a minimum difference with the compressed feature vector obtained from the compression means out of the compressed feature vectors stored in the dictionary. The quantization carried out in the quantizer means may be linear or non-linear. According to the character recognition apparatus of the present invention, it is possible to effectively compress the feature vector so that the information lost is suppressed to an extremely small quantity. Thus, it is possible to greatly reduce the capacity of the dictionary without greatly deteriorating the accuracy of the character recognition. Furthermore, it is possible to greatly reduce the matching time in the matching means because the feature vector is compressed.

Still another object of the present invention is to provide a character recognition apparatus further comprising a distance table which stores a table of distances between feature vectors, and the matching means matches the compressed feature vector obtained from the compression means with each of the compressed feature vectors stored in the dictionary so as to output at least one candidate character corresponding to one of the standard characters described by a compressed feature vector having a minimum distance from the compressed feature vector obtained from the compression means by making access to the distance table. According to the character recognition apparatus of the present invention, it is possible to further reduce the matching time in the matching means since the distance table is used.

Other objects and further features of the present invention will be apparent from the following detailed description when read in conjunction with the accompanying drawings.

BRIEF DESCRIPTION OF THE DRAWINGS

FIG. 1 shows an example of a direction code in relation to a dot pattern;

DETAILED DESCRIPTION

Figure 2:
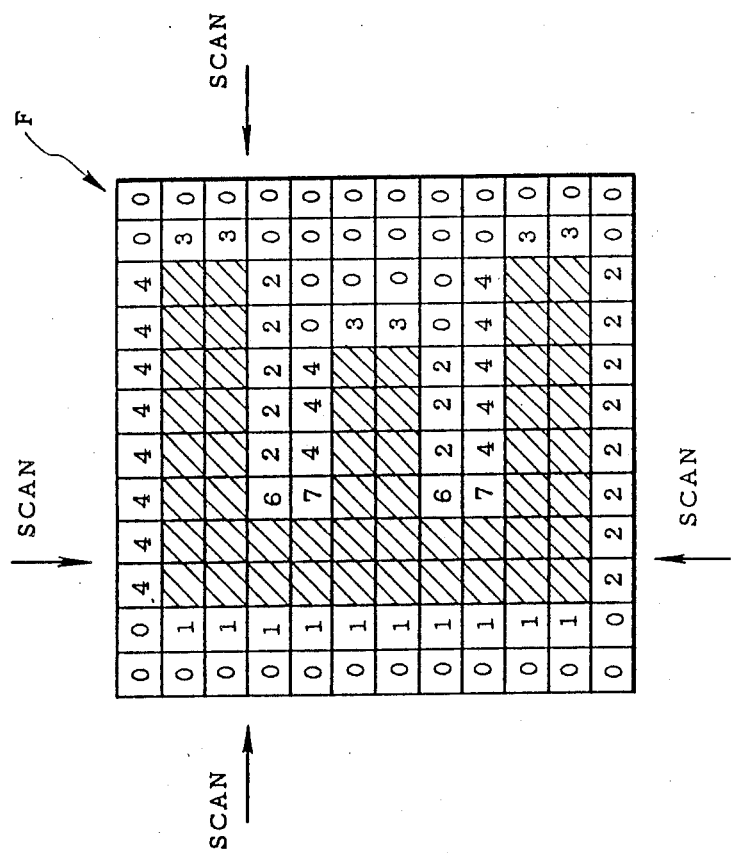
FIG. 2 shows a frame containing a character pattern for explaining the n degree peripheral pattern.
Figure 3A:
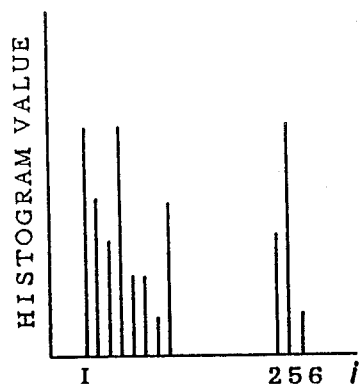
FIGS. 3A through 3C respectively show histograms for explaining a histogram of the feature vector obtained by the n degree peripheral pattern, a histogram of the feature vector rearranged in a sequence from the largest sum of average value and standard deviation, and a histogram obtained by grouping after the rearrangement.

First, a description will be given on the principle of a data compression used in the character recognition apparatus according to the present invention. It is assumed for convenience' sake that a frame containing a character pattern is divided into regions of four by four, there are eight kinds of direction codes and the peripheral pattern is extracted to a second-degree peripheral pattern. Accordingly, the degree of the feature vector is 256 ($=8\times4\times4\times2$). FIG. 3A shows an example of the feature vector, where i denotes the degree and $i=1, 2, \ldots, 256$.

When compressing the feature vector by 1/N, the components of the feature vector are grouped for every N degrees. In the present case, N=4, and the components of the feature vector are grouped for every 4 degrees into 64 groups. When grouping the components of the feature vector, the components are distributed uniformly depending on the size of a sum of an average value and standard deviation (or variance) of the components for each degree.

Figure 3B:
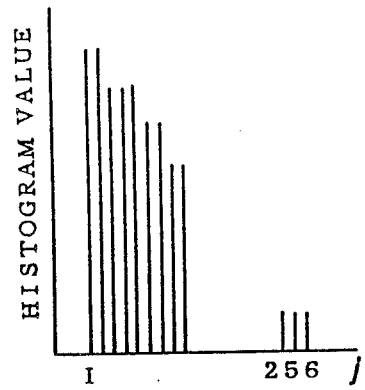

The average value and standard deviation (or variance) of the components of the feature vectors are obtained for each degree when making the dictionary, and the components of the feature vectors of the input character are rearranged from the degree having the largest value. By this rearrangement, the feature histogram shown in FIG. 3A becomes as shown in FIG. 3B. In FIG. 3B, j denotes the degree after the rearrangement and j=1, 2, . . . , 256.

Figure 3C:
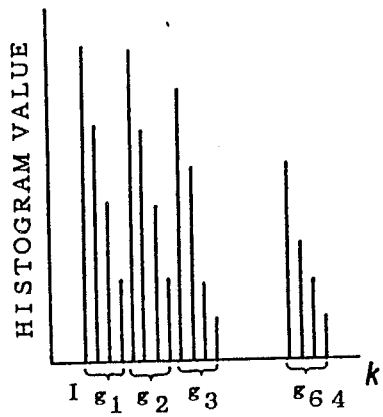

The components of the feature vectors rearranged by degree are sequentially distributed into 64 groups g1 through g64. As a result, the components of the feature vector shown in FIG. 3A are finally rearranged of the degree as shown in FIG. 3C. In FIG. 3C, the degree is arranged in the sequence from the large sum of the average value and standard deviation within each group which is made for every 4 degrees. A degree K in FIG. 3C can be described by the following formula.

$$K = N \times MOD(j-1, 256/N) + (j-1)/(256/N)$$

In the present case, each of the groups g1 through g64 are quantized into 1-byte (8-bit) data. A 64-degree vector having the 1-byte data as the components thereof is obtained as a compressed vector of the feature vector.

Next, a description will be given on the quantization of each of the groups g1 through g64. The components of the feature vector having the degree thereof rearranged as shown in FIG. 3B are divided into N (=4) large groups n1 through n4 from the beginning (j=1). The components of j=1 to j=64 within the large group n1 finally become the first degree components of the groups g1 through g64. The components of j=64 to j=128 within the large group n2 finally become the second degree components of the groups g1 through g64. Similarly, the components within the large group n3 finally become the third degree components of the groups g1 through g64, and the components within the large group n4 finally become the fourth degree components of the groups g1 through g64.

The degree with the large standard deviation (variance) includes a large information quantity for the character recognition. Hence, when carrying out the quantization, the quantizing error becomes small when the degree with the large standard deviation (variance) is assigned a large quantization level. However, the degree with the large standard deviation (variance) but a small average value has a small histogram value, and thus, it is inefficient to assign a large number of quantization levels to such a degree. Accordingly, it is effective from the points of view of both the quantizing error and efficiency to assign a large number of quantization levels to the degree with a large sum of the average value and standard deviation (variance).

Figure 4:
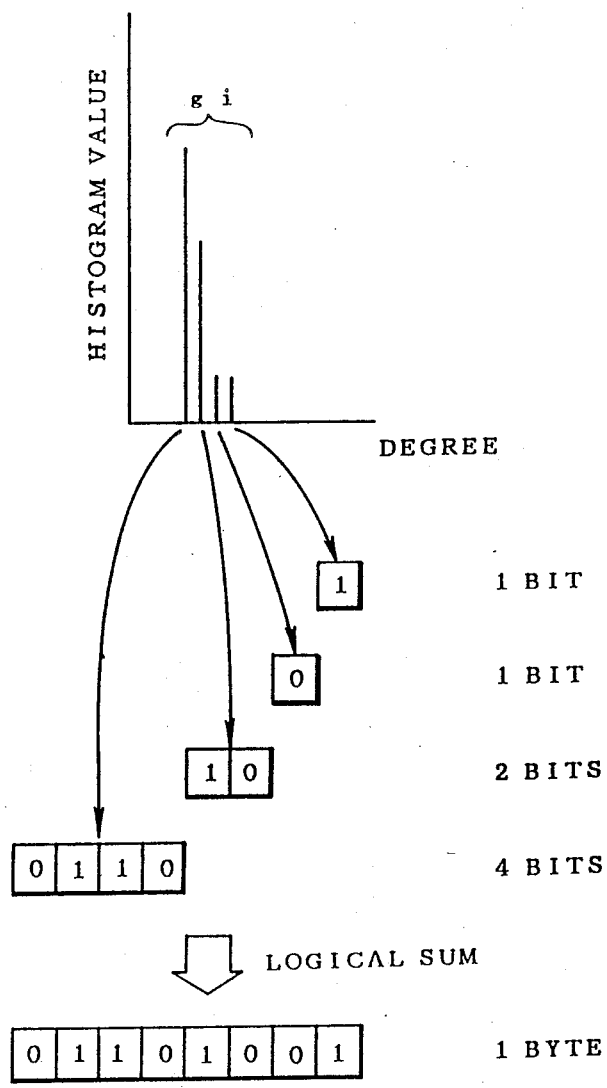
FIG. 4 is a diagram for explaining the quantization of the feature vector in groups.

In other words, it is effective to assign the largest number of quantization levels to the first degree of each of the groups g1 through g64, and successively reduce the number of quantization levels assigned to the second and subsequent degrees of each of the groups g1 through g64. Hence, in the present case, the first degree of each of the groups g1 through g64 is quantized in sixteen levels, the second degree in four levels, and the third and fourth degrees in two levels. That is, the quantized data are 4 bits, 2 bits, 1 bit and 1 bit for the first, second third and fourth degrees, respectively. The 1-byte quantized data is obtained by taking a logical sum of the 4-bit, 2-bit, 1-bit and 1-bit quantized data, as may be seen from FIG. 4. The vector having as the components thereof the quantized data of each of the groups g1 through g64 are obtained as the compressed feature vector.

Therefore, according to the present invention, the components of the feature vector are uniformly distributed from the largest sum of the average value and the standard deviation (variance) for each degree with respect to each of the groups g1 through g64. Furthermore, the quantization number is optimized for each degree. As a result, it is possible to efficiently compress the feature vector.

It is possible to distribute the components of the feature vector into the groups in a sequence from the smallest sum of the average value and the standard deviation (variance). In this case, the size of the quantization number assigned to each degree of the groups is reversed in relation to the case above described.

In addition, depending on the kind of character to be recognized and especially depending on the characteristic of the feature vector, it is possible to distribute the components of the feature vector into the groups in a sequence from a largest average value for each degree, standard deviation (variance) or difference between the two.

Figure 5:
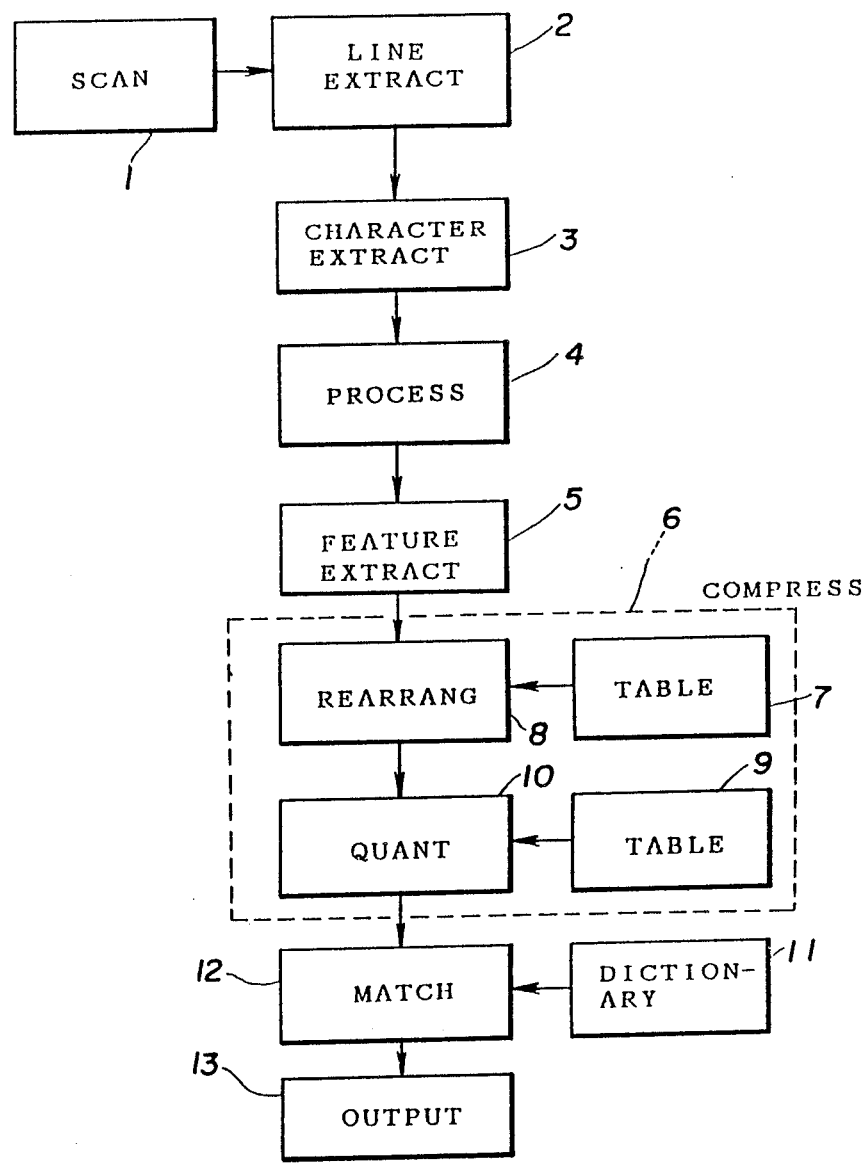
FIG. 5 is a system block diagram showing a first embodiment of the character recognition apparatus according to the present invention.
Figure 6:
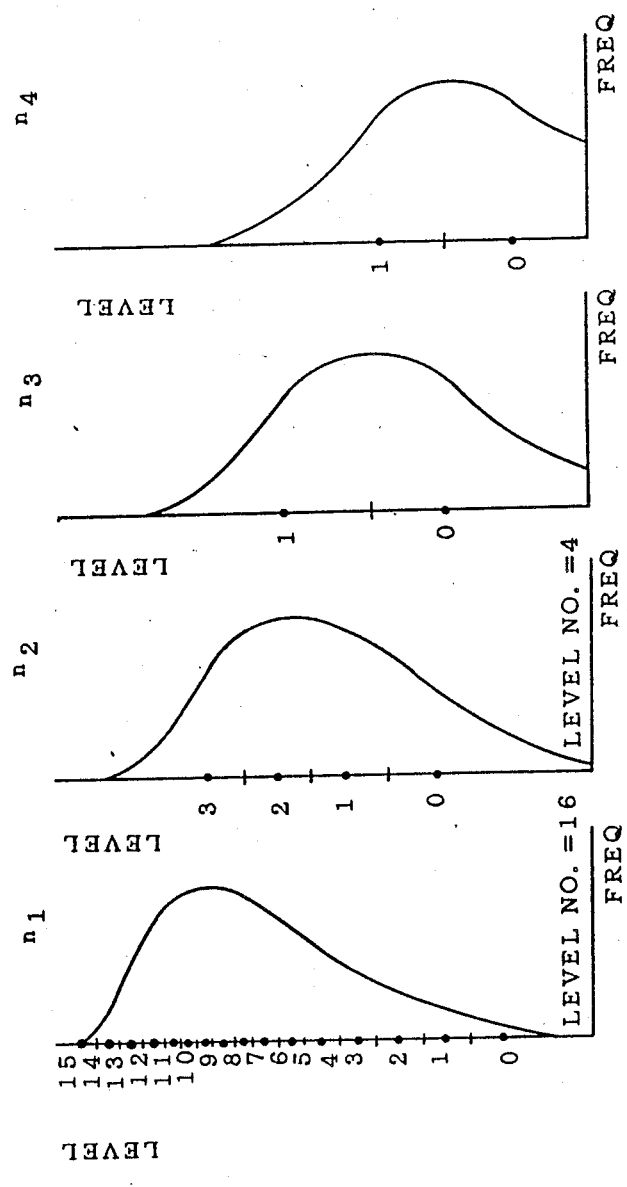
FIGS. 6A through 6D are diagrams for explaining a threshold value of the quantization level for a non-linear quantization.

FIG. 5 shows a first embodiment of the character recognition apparatus according to the present invention. The character recognition apparatus comprises a scanner 1, a line extracting part 2, a character extracting part 3, a processing part 4, a feature extracting part 5, a compression part 6, a dictionary 11, a matching part 12, and an output part 13.

The scanner 1 scans a document (not shown) and an output binary image data thereof is supplied to the line extracting part 2. The line extracting part 2 extracts one line of characters from the output binary image data of the scanner 1, and the character extracting part 3 extracts one character from the one line of characters obtained from the line extracting part 2. The processing part 4 subjects the image of the extracted character to a processing such as normalization of the character image and elimination of noise. The feature extracting part 5 extracts feature vector of the processed character image by using the n degree peripheral pattern. As described before, the feature vector is a 256 degree vector in the present embodiment.

The compression part 6 compresses the feature vector from the feature extracting part 5 by the quantization described before. The compression part 6 comprises a rearranging table 7, a rearranging part 8, a quantization level table 9, and a quantizer part 10.

The feature vector extracted from the standard patterns and using the n degree peripheral pattern is compressed to 64 degrees (64 bytes) as described before, and registered in the dictionary 11. The matching part 12 searches for at least one candidate character by matching the compressed feature vector from the compression part 6 and the compressed feature vectors registered in the dictionary 11. The one or plurality of candidate characters from the matching part 12 are supplied to the output part 13 which outputs the one or plurality of candidate characters by performing a process such as storing and printing the one or plurality of candidate characters.

Next, a description will be given on the operation of the compression part 6. The rearranging table 7 is used for the rearrangement of the degrees of the feature vector described before. In the stage of making the dictionary 11, the sum of the average value and standard deviation is obtained for each degree of the feature vector, and the rearranging table 7 is made based on sums which are obtained. The rearranging part 8 refers to the rearranging table 7 so as to rearrange the degree of the feature vector supplied from the feature extracting part 5, and successively supplies to the quantizer part 10 each of the groups of four degrees.

The quantizer part 10 makes access to the quantization level table 9 by use of the values (histogram values) of the components of each degree in each of the groups, and reads out the 1-byte quantized data. In the present embodiment, the quantizer part 10 carries out a linear quantization, and the quantization level is determined from the following formula for each degree, where Q denotes the quantization level, Cl denotes a constant for each degree within each group, l=1, 2, 3, 4, and L denotes the component value (direction code number) of each degree.

$$Q = Cl \times L$$

According to the present embodiment, it is possible to efficiently compress the feature vector, and it is possible to greatly reduce the capacity of the dictionary because the contents of the dictionary is similarly compressed. According to experiments conducted by the present inventor, it is possible to reduce the capacity of the dictionary for recognizing hand-written characters to approximately ½ the conventionally required capacity, and it is possible to reduce the capacity of the dictionary for recognizing typed characters to approximately ¼ the conventionally required capacity. Further, it was confirmed that the slight degradation in the recognition accuracy due to the use of compressed feature vector is within a tolerable range and thus negligible from the practical point of view. In addition, it is possible to considerably improve the matching speed when matching the input feature vector with those registered in the dictionary, because the feature vector is compressed. According to the experiments conducted by the present inventor, it is possible to increase the matching speed to approximately two times in the case of the recognition of hand-written characters and to approximately four times in the case of the recognition of typed characters.

Next, a description will be given on a second embodiment of the character recognition apparatus according to the present invention in which the four degrees in each of the groups g1 through g64 after the rearrangement is quantized by a non-linear quantization as opposed to the linear quantization used in the first embodiment.

For example, in the case of the degree (that is, the first degree within the groups g1 through g64) of the large group n1 described before, an information quantity can be described by the following entropy H when the probability of "0" or "1" occurring for each bit of the quantized data (4 bits) is denoted by Pk (k=1, 2, 3 and 4).

$$H = -\Sigma Pk \cdot \log Pk$$

The entropy H becomes a maximum only when the probability Pk for all of the bits becomes the same, that is, ½. In other words, it is possible to make the information quantity a maximum by determining a threshold value of each quantization level non-linearly so that the same number of data occur within each of the quantization levels. The same holds true for the large group n2 (second degree within the groups), the large group n3 (third degree within the groups), and the large group n4 (fourth degree within the groups).

The quantization levels for each of the large groups n1 through n4 obtained by the consideration above described are shown in FIGS. 6A through 6D, respectively. In FIGS. 6A through 6D, the scale on the ordinate indicates the threshold value of the quantization level, a dot mark indicates a representative value within the quantization level, and the abscissa indicates the frequency.

By determining the threshold value of the quantization level so that the probability of "0" or "1" occurring within each of the quantization levels is approximately constant and carrying out the non-linear quantization on each degree of the groups g1 through g64 made by the rearrangement of the degrees, it is possible to further reduce the quantizing error. Therefore, it is possible to even further reduce the deterioration in the recognition accuracy due to the compression of the feature vector.

According to the compression carried out in the second embodiment, the threshold values of the quantization levels are non-linear (not equidistant), and the number of bits assigned to each degree within the groups is not constant. For this reason, it is impossible to know what the histogram looks like solely from the values of the degrees. For example, the degree of the large group n1, that is, the value "2" after the quantization of the first degree within a group, corresponds to a value of "5" to "7" before the quantization. On the other hand, the degree of the large group n2, that is, the value "2" after the quantization of the second degree, corresponds to a value of "10" to "13" before the quantization. Moreover, four degrees are compressed into one degree. Accordingly, it is difficult to calculate the difference between the input compressed feature vector and each similarly compressed feature vector registered in the dictionary by a simple comparison thereof. When performing the matching with each compressed feature vector registered in the dictionary, it is necessary to first develop the compressed data of the first degree into data in four degrees before calculating the distance between the input character and each character registered in the dictionary. However, such a calculation of the distance takes a long processing time to perform, and the matching efficiency becomes poor.

Hence, it is preferable to calculate beforehand the distance between various compressed feature vectors and store such calculated results in a table of the character recognition apparatus. When calculating the distance, the center value of each of the quantization levels is used as a representative point for each degree within the groups. The calculation of the distance and the table which stores the calculated results will now be described in conjunction with FIGS. 7 and 8.

Figure 7:
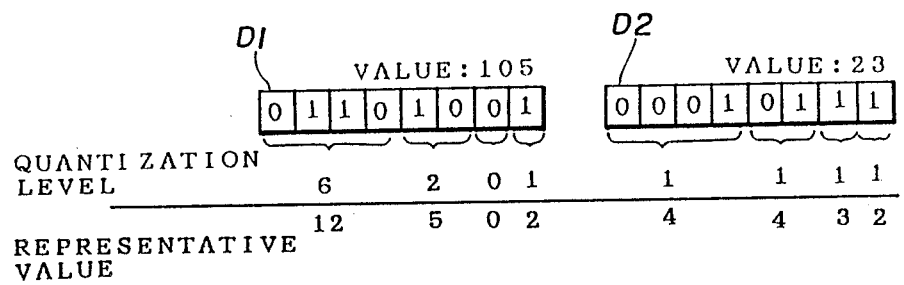
FIG. 7 is a diagram for explaining the method of calculating a distance between two compressed data.
Figure 8:
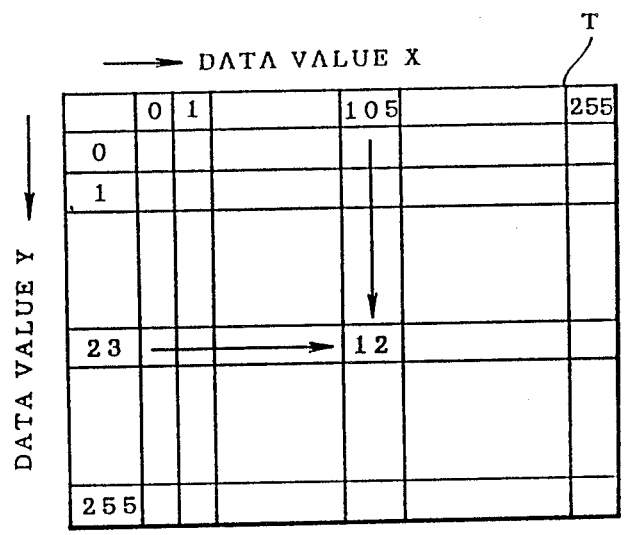
FIG. 8 is a diagram for explaining a distance table which stores calculated distances.

In FIG. 7, D1 and D2 denote one byte of compressed data for each of the groups. The distance between the compressed data D1 and D2 is calculated as follows.

The upper four bits of the compressed data D1 are described in six quantization levels, and a corresponding representative value is "12". Next upper two bits of the compressed data D1 are described in two quantization levels, and the corresponding representative value is "5". A next upper one bit of the compressed data D1 is described in 0 quantization level, and the corresponding representative value is "0". A lowermost one bit of the compressed data D1 is described in one quantization level, and the corresponding representative value is "2". The quantization level and representative value are similarly selected for the compressed data D2 as may be seen from FIG. 7. Accordingly, a distance d between the compressed data D1 and D2 can be calculated as follows.

$$d = |12-4| + |5-4| + |0-3| + |2-2| = 12$$

When the compressed data D1 and D2 are taken as binary numbers, the values of these compressed data D1 and D2 are "105" and "23", respectively. Hence, the distance "12" between the compressed data D1 and D2 is stored in a distance table T having the structure shown in FIG. 8. As may be understood from FIG. 8, it is possible to immediately read out the distance "12" by looking up the distance table T with a data value X and a data value Y which are respectively equal to the values of the compressed data D1 and D2. The capacity of the distance table T is 64 kbytes ($=256 \times 256$).

Figure 9:
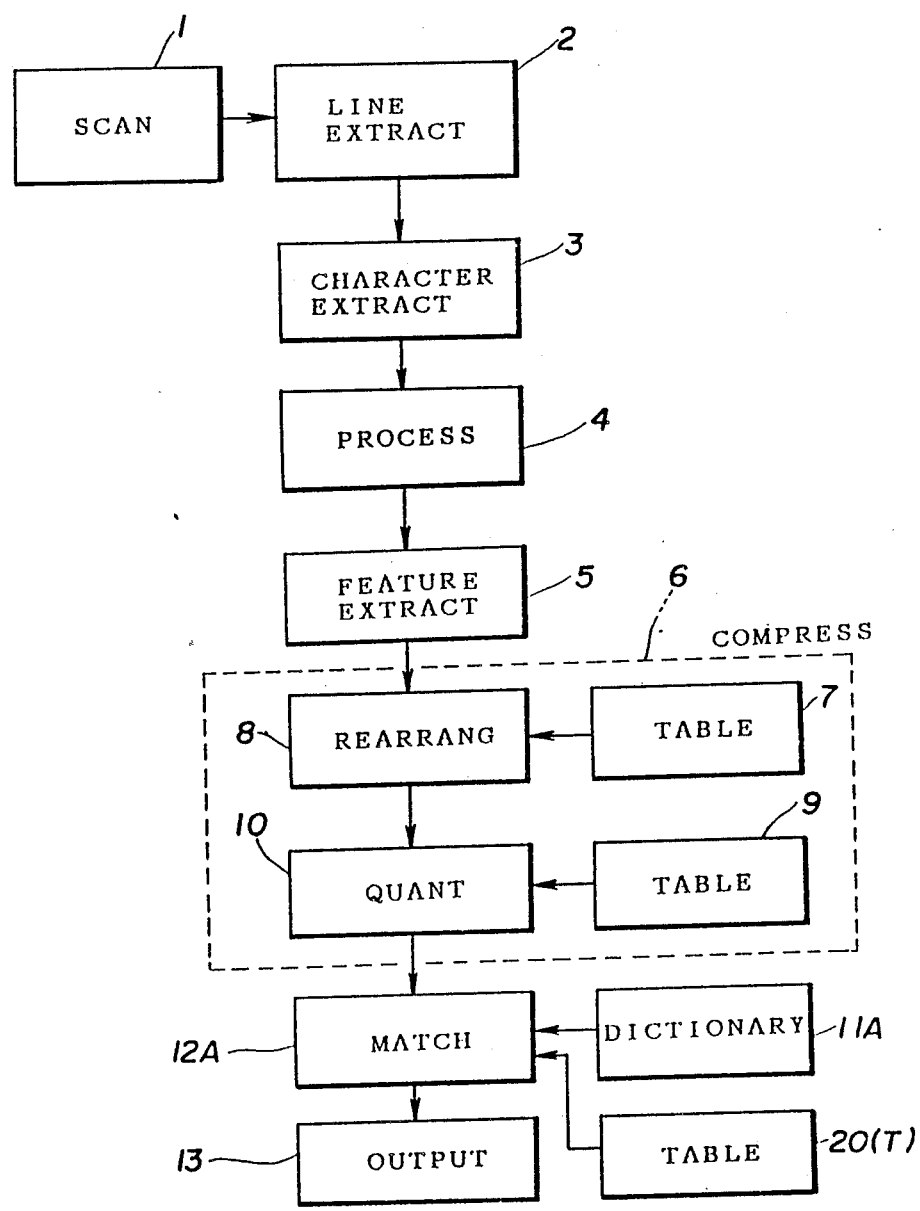
FIG. 9 is a system block diagram showing a second embodiment of the character recognition apparatus according to the present invention.

FIG. 9 shows the second embodiment of the character recognition apparatus according to the present invention. In FIG. 9, those parts which are the same as those corresponding parts in FIG. 5 are designated by the same reference numerals, and a description thereof will be omitted.

A dictionary 11A is made up of a plurality of dictionary parts which store the 256 degree feature vectors in a compressed form of 64 degrees (64 bytes) by carrying out the non-linear quantization described before. A distance table 20 corresponds to the distance table T described before.

A matching part 12A searches for at least one candidate character by matching the compressed feature vector from the compression part 6 and each compressed feature vector registered in the dictionary 11A. When carrying out the matching, the calculation of the distance between the two compressed feature vectors need not performed by developing the compressed data, but can be performed by making access to the distance table 20 (T) by use of the two compressed data for comparison so as to read out a corresponding distance value. The distance between the feature vector of the input character and the feature vector registered in the dictionary is calculated by cumulative addition. Hence, it is possible to carry out the matching at a high speed.

According to the present embodiment, it is possible to obtain essentially the same effects as those obtainable in the first embodiment. In addition, it is possible to considerably reduce the matching time by the use of the distance table 20.

Therefore, the present invention effectively uses the fact that the feature vector using the n degree peripheral pattern has an average value and standard deviation (variance) which greatly differ for each degree and each of the degrees are independent from each other thereby permitting the rearrangement of the degree. In other words, the components of the feature vector using the n degree peripheral pattern are grouped for every predetermined number of degrees. When grouping the components of the feature vector, the components are distributed uniformly depending on the size of the sum of the average value and standard deviation (variance) of the components for each degree. The components within each group are quantized with a quantization level for each degree so as to obtain quantized data of a predetermined number of bits. As a result, a compressed feature vector is obtained having the quantized data as the components thereof.

Further, the present invention is not limited to these embodiments, but various variations and modifications may be made without departing from the scope of the present invention.

What is claimed is:

1. A character recognition apparatus comprising:
    scanning means for scanning a document and for producing image data related to the document;
    character extracting means for extracting from the output image data of said scanning means a character contained in a frame;
    feature extracting means for extracting a feature of the character extracted in said character extracting means in a form of a feature vector, said feature vector having components which are histogram values of n degree peripheral pattern describing the feature of the character by distances from an arbitrary side of the frame to each of first through nth detected contour of the character within the frame;
    compression means for compressing the feature vector from said feature extracting means into a compressed feature vector having components which are quantized data, said compression means comprising rearranging means for grouping the components of the feature vector into a predetermined number of groups for every predetermined number of degrees by uniformly distributing the components of the feature vector to each group depending on a sum of an average value and standard deviation of the components of the feature vector for each degree, and quantizer means for quantizing the components in each group with an independent quantization level for each group so as to obtain the quantized data having a predetermined number of bits for each group;
    a dictionary which stores compressed feature vectors of standard characters; and
    matching means for matching the compressed feature vector obtained from said compression means with each of the compressed feature vectors stored in said dictionary so as to output at least one candidate character corresponding to one of the standard characters described by a compressed feature vector having a minimum difference with the compressed feature vector obtained from said compression means out of the compressed feature vectors stored in said dictionary.

2. A character recognition apparatus as claimed in claim 1 in which said quantizer means quantizes the components in each group with a quantization level which increases as the sum of the average value and standard deviation of the components of the feature vector for each degree increase.

3. A character recognition apparatus as claimed in claim 1 in which said quantizer means quantizes the components in each group according to a linear quantization.

4. A character recognition apparatus as claimed in claim 3 in which said quantizer means determines the quantization level for each degree according to a formula $Q = Cl \times L$, where Q denotes the quantization level, Cl denotes a constant for each degree within each group, $l = 1, 2, \ldots, n$, and L denotes a component value of each degree.

5. A character recognition apparatus as claimed in claim 1 in which said rearranging means groups the components of the feature vector into the predetermined number of groups for every predetermined number of degrees by uniformly distributing the components of the feature vector to each group from a largest sum of the average value and standard deviation of the components of the feature vector for each degree.

6. A character recognition apparatus as claimed in claim 1 in which said rearranging means groups the components of the feature vector into the predetermined number of groups for every predetermined number of degrees by uniformly distributing the components of the feature vector to each group from a smallest sum of the average value and standard deviation of the components of the feature vector for each degree.

7. A character recognition apparatus as claimed in claim 1 in which said rearranging means comprises a first table which stores table of average values and standard deviations of the components of the feature vector obtained from said feature extracting means for each degree and a rearranging part for rearranging the degree of the components of the feature vector obtained from said feature extracting means by referring to said first table, and said quantizer means comprises a second table which stores a table of quantization levels and a quantizer part for quantizing the components in each group with the independent quantization level for each group by making access to said second table by use of values of the components in each group.

8. A character recognition apparatus as claimed in claim 1 in which said quantizer means quantizes the components in each group according to a non-linear quantization.

9. A character recognition apparatus as claimed in claim 8 in which a threshold value within each quantization level is set in said quantizer means so that a probability of a certain logic value occurring for each bit of the quantized data is approximately constant.

10. A character recognition apparatus as claimed in claim 8 which further comprises a distance table which stores a table of distances between feature vectors, said matching means matching the compressed feature vector obtained from said compression means with each of the compressed feature vectors stored in said dictionary so as to output at least one candidate character corresponding to one of the standard characters described by a compressed feature vector having a minimum distance from the compressed feature vector obtained from said compression means by making access to said distance table.

11. A character recognition apparatus as claimed in claim 10 in which said distances stored in said distance table are calculated by using a center value of the quantization levels in each group as a representative point.

* * * * *